Feb. 1, 1944. B. T. O'SHAUGHNESSY, JR., ET AL 2,340,423
EXPANSION RIVET
Filed Sept. 3, 1942
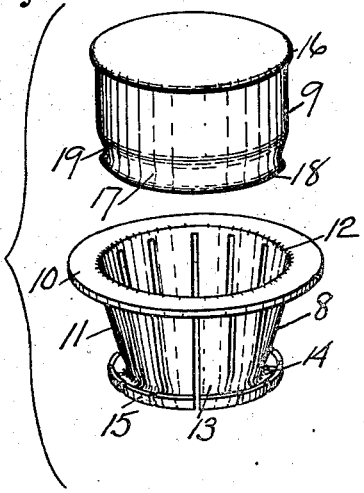
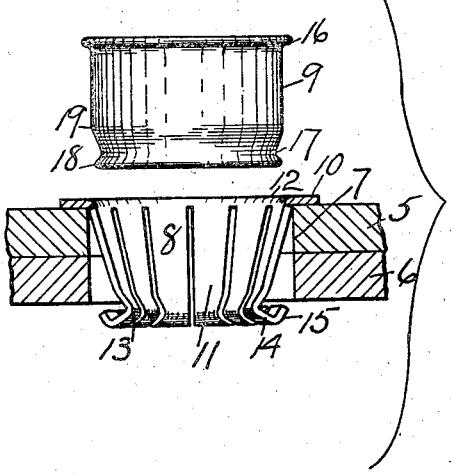
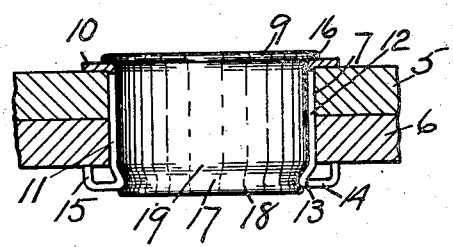
INVENTOR
Bernard T. O'Shaughnessy, Jr.
Charles H. Desso,
by
Arthur B. Jenkins,
ATTORNEY Patented Feb. 1, 1944

2,340,423

UNITED STATES PATENT OFFICE 2,340,423

EXPANSION RIVET

Bernard T. O'Shaughnessy, Jr., Hartford, and Charles H. Desso, Manchester, Conn.

Application September 3, 1942, Serial No. 457,179

1 Claim. (Cl. 85—40)

Our invention relates to the class of fastening devices comprising two members which may be separated to release the structures which are held by them, and an object of our invention, among others, is the construction of a rivet of this type of simple construction and which will effectively accomplish the purpose for which it is to be employed.

One form of an expansion rivet embodying the invention and in the construction and use of which the objects herein set out, as well as others, may be attained is illustrated in the accompanying drawing, in which—

Figure 1 is a perspective view of the two parts of the rivet separated but in relative positions for being united.

Figure 2 is a view in section through the socket member of the rivet illustrating the manner of use, the plug member being shown in position for insertion into the socket member.

Figure 3 is a view in section through the socket member showing the plug member in place and the rivet conditioned for fastening two pieces together.

While rivets embodying our invention may be used in structures of various types where it is desired to secure two members together, and especially in a manner to provide for separation of the rivet parts to permit loosening of the fastened members, the invention is found to be especially applicable in the fastening of cowls of aeroplanes in position, but as above stated, the device may be used for fastening various structures together and is therefore not limited in its application for any purpose for which it may be found applicable.

In the accompanying drawing the numerals 5 and 6 denote two pieces or members which are shown as fastened together by our improved expansion or separable rivet, these members each having a hole 7 through which the socket member of the rivet is passed in the operation of securing the two parts together.

The rivet comprises a socket member 8 and a plug member 9, the latter being adapted for insertion in the socket member as shown in Fig. 3. The socket member is of hollow formation and preferably round in contour in cross section. It comprises a rim 10 of circular form and from which spring arms 11 project, these arms, in normal and unrestrained condition bounding an opening 12 of inverted frusto-conical shape of smaller dimensions at its inner than at its outer end. Each of the arms at those ends opposite the rim 10 is bent inwardly to create expanding bends 13 and from these bends the ends of the arms are bent outwardly as at 14 and then backwardly to create clamping holders 15 the ends of which are adapted to abut against the fastened member 6 in opposition to the rim 10 which is seated against the fastened member 5 when the rivet is in securing position.

The plug member 9 may be of solid formation or it may be hollow, in the latter case it being of sufficient strength to effectually resist any force tending to separate the fastened members 5 and 6 and consequently to separate the socket and plug members of the rivet. This plug member is provided with a bead 16 extending around its outer end to limit inward movement of the plug within the socket member. An annular groove 17 is formed near the inner end of the plug member to receive the expanding bends 13 at the inner ends of each of the spring arms 11 thus creating a circumferential expander 18 for the extremities of said arms and a retainer 19 on the opposite side of the groove 17 from the expander 18 as shown in Fig. 3 of the drawing.

In the use of the rivet the socket member 8 is inserted through the holes 7 in the members 5—6, as shown in Fig. 2, with the spring arms 11 in converging relation inwardly from the rim 10 as shown in said figure. The plug member 9 is then inserted into the socket member and the expander 18 contacting with the expanding bends 13 force the inner ends of the spring arms 11 outwardly into the position shown in Fig. 3 thereby forcing the holders 15 into close engagement with the surface of the member 6 and in opposition to the resistance of the rim 10. In this position the expanding bends 13 at the ends of the arms 11 are located in the annular groove 17 and the members 5—6 are thereby fastened securely together.

To loosen the members 5—6 a tool, as a screw driver, may be forced in between the bead 16 and the rim 10, the inner ends of the arms 11 comprising the bends 13—14—15 yielding enough to permit movement of the expander 18 past the expanding bends 13 and allowing the plug 9 to be removed from within the socket member 8.

While the lip 16 is shown herein as comprising a part of the plug member, it is contemplated that this lip may be dispensed with, and the engagement of the bends 13 with the groove 17 in the end of the plug member will retain the plug member in place, the principal object of the latter being merely to force the arms 11 outwardly into engagement with the wall of the holes 7.

While the use of a tool, as a screw driver, thrust underneath the lip 16 has been described as a means for removing the plug member from the socket member, when said lip is omitted any means in the end of the plug member to be engaged by a suitable tool may be employed for removing the plug member from the socket member.

In accordance with the provisions of the patent statutes we have described the principles of operation of our invention together with the device which we now consider to represent the best embodiment thereof; but we desire to have it understood that the device shown is only illustrative and that the invention may be carried out by other means and applied to uses other than those above set out.

We claim:

An expansion rivet comprising a socket member having spring arms of substantially even thickness throughout their length and disposed when expanded to form a hollow body of a shape substantially that of an opening through objects to be fastened together and to closely fit said openings throughout the length of said hollow body, means for positioning said member within said objects comprising an annular rim on one end of said member adapted to be moved into abutting engagement with the adjacent object, holders at the free ends of said arms adapted for pressure against the other one of said objects to oppose force exerted upon said positioning means, a plug member of substantially cylindrical shape formed to fit within and enter said socket member and engage said arms to force said holders into close engagement with one of said objects and bring the axes of said holders into straight lines parallel to the axis of said socket member, and interengaging means between said arms and plug to restrain disengaging movement of said plug from within said socket member.

BERNARD T. O'SHAUGHNESSY, Jr.
CHARLES H. DESSO.